(12) United States Patent
Filiatrault et al.

(10) Patent No.: US 10,406,604 B2
(45) Date of Patent: Sep. 10, 2019

(54) FACING ACCESSORY FOR A PORTABLE BORING APPARATUS

(71) Applicant: Usinage Filiatrault Inc., Palmarolle (CA)

(72) Inventors: Stephane Filiatrault, Palmarolle (CA); Guy Filiatrault, Palmarolle (CA); Paul Fortin, Palmarolle (CA)

(73) Assignee: Usinage Filiatrault Inc., Palmarolle, QC (CA)

( * ) Notice: Subject to any disclaimer, the term of this patent is extended or adjusted under 35 U.S.C. 154(b) by 0 days.

(21) Appl. No.: 15/511,322

(22) PCT Filed: Sep. 15, 2015

(86) PCT No.: PCT/IB2015/057098
§ 371 (c)(1),
(2) Date: Mar. 15, 2017

(87) PCT Pub. No.: WO2016/042486
PCT Pub. Date: Mar. 24, 2016

(65) Prior Publication Data
US 2017/0282256 A1  Oct. 5, 2017

Related U.S. Application Data

(60) Provisional application No. 62/050,448, filed on Sep. 15, 2014.

(51) Int. Cl.
*B23B 29/034* (2006.01)
(52) U.S. Cl.
CPC .. *B23B 29/03439* (2013.01); *B23B 29/03471* (2013.01); *B23B 29/03407* (2013.01); *B23B 2270/32* (2013.01); *B23B 2270/58* (2013.01)

(58) Field of Classification Search
CPC ........ B23B 29/03432; B23B 29/03439; B23B 29/03471; B23B 29/03467;
(Continued)

(56) References Cited

U.S. PATENT DOCUMENTS 1,519,390 A * 12/1924 Wray ................ B23B 29/03439
29/26 R
3,067,637 A * 12/1962 Horning ............ B23B 29/03442
408/181

(Continued)

FOREIGN PATENT DOCUMENTS

AT      220913 B  *  4/1962  ....... B23B 29/03439
CA   2835635 A1  * 11/2012  ............... B23Q 9/02
(Continued)

OTHER PUBLICATIONS

Description 2308654 (translation) obtained at https://worldwide.espacenet.com/ (last visited Jan. 18, 2019).*
(Continued)

*Primary Examiner* — Ryan C Rufo
(74) *Attorney, Agent, or Firm* — Taft Stettinius & Hollister LLP

(57) ABSTRACT

There is described a facing accessory for a portable boring apparatus, the accessory comprising: a shaft mounting portion for mounting to a longitudinal shaft of the portable boring apparatus extending along a longitudinal axis; a tool holder secured to the shaft mounting portion and adapted to receive a facing tool thereon, the tool holder comprising at least a telescopic arm for enabling movement of the facing tool towards and away from the shaft mounting portion along a radial axis relative to the longitudinal shaft; and an actuator operatively connected to the second section of the telescopic section for translating the second section relative to the first section along the radial axis.

7 Claims, 14 Drawing Sheets

(58) Field of Classification Search
CPC ........ B23B 29/03425; B23B 29/03403; B23B 29/03489; B23B 29/03435; B23B 29/26; Y10T 82/2512; Y10T 82/12; Y10T 82/125; Y10T 408/856
See application file for complete search history.

(56) References Cited

U.S. PATENT DOCUMENTS

| | | | | |
|---|---|---|---|---|
| 3,710,659 | A | * | 1/1973 | Pagella .............. B23B 29/03435 82/1.2 |
| 4,038,740 | A | | 8/1977 | Grinage |
| 4,164,381 | A | * | 8/1979 | Lovendahl ............ B23B 29/025 408/181 |
| 4,321,746 | A | | 3/1982 | Grinage |
| 4,637,285 | A | * | 1/1987 | Mizoguchi ........ B23B 29/03439 408/181 |
| 4,944,198 | A | | 7/1990 | Natale et al. |
| 5,050,291 | A | * | 9/1991 | Gilmore .................. B23B 3/265 29/560 |
| 5,251,511 | A | * | 10/1993 | Muendlein ........ B23B 29/03403 408/152 |
| 5,293,794 | A | | 3/1994 | Mosey |
| 5,429,021 | A | * | 7/1995 | Astle ......................... B23B 3/26 82/1.3 |
| 5,439,431 | A | | 8/1995 | Hessbruggen et al. |
| 5,477,597 | A | | 12/1995 | Catania et al. |
| 5,630,346 | A | * | 5/1997 | Strait ...................... B23B 3/265 82/113 |
| 6,447,220 | B1 | * | 9/2002 | Ricci ....................... B23B 29/02 408/102 |
| 2004/0187658 | A1 | * | 9/2004 | Moruzzi ................. B23B 5/162 82/123 |
| 2005/0155471 | A1 | * | 7/2005 | Ricci ....................... B23B 3/265 82/123 |
| 2005/0247171 | A1 | * | 11/2005 | Kawashima .............. B23B 3/26 82/113 |
| 2008/0060490 | A1 | * | 3/2008 | Sorensen ............... B23B 29/022 82/1.11 |
| 2015/0151363 | A1 | * | 6/2015 | Backhouse .............. B23Q 9/02 82/134 |

FOREIGN PATENT DOCUMENTS

| | | | | | |
|---|---|---|---|---|---|
| CH | 258909 | A | * | 12/1948 | ....... B23B 29/03439 |
| CH | 270094 | A | * | 8/1950 | ....... B23B 29/03435 |
| CH | 351015 | A | * | 12/1960 | ....... B23B 29/03439 |
| CH | 518765 | A | * | 2/1972 | ....... B23B 29/03439 |
| DE | 1920654 | A1 | * | 11/1969 | ....... B23B 29/03471 |
| DE | 2308654 | A1 | * | 9/1973 | ....... B23B 29/03467 |
| EP | 0060453 | A2 | * | 9/1982 | ....... B23B 29/03471 |

OTHER PUBLICATIONS

International Search Report; Canadian Intellectual Property Office; International Application No. PCT/IB2015/057098; dated Nov. 24, 2015; 4 pages.

Written Opinion of the International Searching Authority; Canadian Intellectual Property Office; International Application No. PCT/IB2015/057098; dated Nov. 24, 2015; 3 pages.

* cited by examiner

FACING ACCESSORY FOR A PORTABLE BORING APPARATUS

CROSS-REFERENCE TO RELATED APPLICATIONS

This application is a U.S. National Phase of International PCT Application No. PCT/IB2015/057098 filed Sep. 15, 2015, which claims the benefit of U.S. Provisional Patent Application Ser. No. 62/050,448 filed Sep. 15, 2014, the entire contents of each Applications hereby incorporated by reference in their entirety.

TECHNICAL FIELD

The invention relates to portable boring apparatuses. More specifically, the invention relates to a facing accessory for a portable boring apparatus.

BACKGROUND

Portable boring apparatuses, also known as line boring machines, are used for machining machinery parts where it would be impossible or impractical to set up said parts on a conventional machine tool (lathe, milling machine, etc.), primarily because of the relatively large size of the parts. Boring machine are specifically used to machine an inner sidewall of the bore (an operation known as "boring") or to machine a rim of the bore (an operation known as "facing") to repair damage caused by wear in this particular area.

Typically, a portable boring apparatus comprises a shaft, rotating means to rotate the shaft and a bracket adapted to be temporarily secured on a workpiece, near a bore to be machined. One or more tool attachment is secured to the shaft and holds a tool which contacts the workpiece in or near the bore to thereby machine the bore.

Most portable boring machines have multiple tools attachments or accessories which are used to machine different parts of the bore. One of these accessories is a facing accessory which is used to machine the rim around the bore. To perform a facing operation, the machine is first attached to the workpiece such that the shaft of the machine, coupled to a motor, extends through the bore. A central clamp portion of the facing accessory is clamped around the shaft such that the tool attached to the facing accessory contacts the rim of the bore, and the shaft is spun to machine the rim.

It may be necessary to machine a relatively large surface around the rim of the bore. In this case, to cover the whole surface, it would be necessary to have a facing accessory which extends radially further from the shaft such that the tool would cover the entire surface of the rim to be machined, but this larger facing accessory may not be able to fit into small spaces.

Alternatively, some facing accessories allow some radial movement of the tool relative to the shaft. In this case, the radial movement is usually coupled to the rotation of the shaft, or is done manually using a rod held by an operator standing next to the operating machine, putting the worker at risk of injury.

There is therefore a need for an apparatus that will overcome at least one of the above-identified drawbacks.

Features of the invention will be apparent from review of the disclosure, drawings and description of the invention below.

BRIEF SUMMARY

According to a first broad aspect, there is provided a facing accessory for a portable boring apparatus, the accessory comprising: a shaft mounting portion for mounting to a longitudinal shaft of the portable boring apparatus extending along a longitudinal axis; a tool holder secured to the shaft mounting portion and adapted to receive a facing tool thereon, the tool holder comprising at least a telescopic arm for enabling movement of the facing tool towards and away from the shaft mounting portion along a radial axis relative to the longitudinal shaft, the telescopic arm comprising at least: a first section secured to the shaft mounting portion and extending radially away from the shaft mounting portion; and a second section extending along the radial axis and slidably connected to the first section to allow a translation of the second section relative to the first section along the radial axis, the facing tool being securable to the second section; and an actuator operatively connected to the second section of the telescopic section for translating the second section relative to the first section along the radial axis.

In one embodiment, the actuator comprises a drive assembly, a transmission assembly operatively connected to the drive assembly, and a screw shaft, the second section of the telescopic arm comprising a threaded opening on a side facing the shaft mounting portion, a first end of the screw shaft being operatively connected to the transmission assembly and a second end of the screw shaft being threadingly engaged in the threaded opening.

In one embodiment, the drive assembly comprises a motor and a drive gear operatively connected to the motor so that activation of the motor triggers rotation of the drive gear.

In one embodiment, the transmission assembly comprises a gear box operatively connected to the drive gear, the gear box comprising at least one driven gear and the first end of the screw shaft being secured to one of the at least one driven gear so that a rotation of the drive gear drives a rotation of the screw shaft, and thereby a translation of the second section along the radial axis.

In one embodiment, the telescopic arm further comprises a third section slidably secured to the first and second sections between the first and second sections so that a translation of the second section drives a translation of the third section along the radial axis.

In one embodiment, the first section comprises a first guide recess and the third section comprises a first protrusion slidably engaged within the first recess, and the second section comprises a second guide recess and the third section comprises a second protrusion slidably engaged within the second recess.

In one embodiment, the first section further comprises a first rack groove extending from the first recess along the radial axis and a first guide rack inserted within the first rack groove, the second section comprises a second rack groove extending from the second recess along the radial axis and a second guide rack inserted within the second rack groove, and the third section comprises an aperture extending therethrough along the longitudinal axis and a synchronization gear rotatably secured within the aperture, the synchronization gear being operatively connected to the first and second guide racks to control an extension of the second and third sections.

In one embodiment, the third section comprises a first guide groove adjacent to the first protrusion and the first section comprises a first tenon projecting therefrom and slidably engaged within the first guide groove, and the third section comprises a second guide groove adjacent to the second protrusion and the second section comprises a second tenon projecting therefrom and slidably engaged within the second guide groove, the first and second guide groove each having a predefined length for limiting a translation of the third section relative to the first section and a translation of the second section relative to the second section, respectively.

In one embodiment, the facing accessory further comprises: a wireless communication unit for receiving a command from a remote controller; and a control unit configured to control the actuator according to the received command, the actuator, the wireless communication unit and the control unit being connectable to an internal power source.

In one embodiment, the shaft mounting portion comprises a first jaw member secured to the tool holder and having a first inner recess for receiving the longitudinal shaft, and a second jaw member having a second inner recess for receiving the longitudinal shaft, the first and second jaw members being securable together around the longitudinal shaft, and the first and second inner recesses forming together a shaft receiving recess sized and shaped to fit snuggly around the longitudinal shaft when the first and second jaw members are secured together.

In one embodiment, the first and second jaw members are hingeably secured together.

In one embodiment, the facing accessory further comprises a double hinge for hingeably securing the first and second jaw members together.

In one embodiment, the second jaw member comprises an internal chamber and a cover for closing the internal chamber, the internal chamber being sized and shaped for receiving the wireless communication unit, the control unit, and the internal power source.

In one embodiment, the wireless telecommunication unit and the control unit are secured to an internal wall of the internal chamber and the cover comprises securing means for having the internal power source secured thereto.

In one embodiment, the facing accessory further comprises at least a first electrical wire having one end connected to the control unit and extending from the control unit to the first jaw member through the double hinge.

In one embodiment, the actuator is secured to an actuator receiving face of the first jaw member.

In one embodiment, the facing accessory further comprises a first electrical connector secured to the actuator receiving face of the first jaw member and electrically connected to the at least a first electrical wire, and a second electrical connector secured to the actuator, the first and second electrical connectors being electrically connected together when the actuator is secured to the actuator receiving face of the first jaw member in order to electrically connect the control unit to the actuator.

In accordance with another broad aspect, there is provided a facing accessory for a portable boring apparatus, the accessory comprising: a shaft mounting portion for mounting to a longitudinal shaft of the portable boring apparatus; a tool holder secured to the shaft mounting portion and adapted to receive a facing tool thereon, the tool holder comprising a translation stage for translating the facing tool towards and away from the shaft mounting portion along a radial axis relative to the longitudinal shaft; an actuator operatively connected to the translation stage for translating the facing tool along the radial axis; a wireless communication unit for receiving a command from a remote controller; and a control unit operatively connected to the wireless communication unit and the actuator, and configured to control the actuator according to the received command, the actuator, the wireless communication unit and the control unit being connectable to an internal power source.

In one embodiment, the shaft mounting portion comprises a first jaw member secured to the tool holder and having a first inner recess for receiving the longitudinal shaft, and a second jaw member having a second inner recess for receiving the longitudinal shaft, the first and second jaw members being securable together around the longitudinal shaft, and the first and second inner recesses forming together a shaft receiving recess sized and shaped to fit snuggly around the longitudinal shaft when the first and second jaw members are secured together.

In one embodiment, the first and second jaw members are hingeably secured together.

In one embodiment, the facing accessory further comprises a double hinge for hingeably securing the first and second jaw members together.

In one embodiment, the second jaw member comprises an internal chamber and a cover for closing the internal chamber, the internal chamber being sized and shaped for receiving the wireless communication unit, the control unit, and the internal power source.

In one embodiment, wherein the wireless telecommunication unit and the control unit are secured to an internal wall of the internal chamber and the cover comprises securing means for having the internal power source secured thereto.

In one embodiment, the facing accessory further comprises at least a first electrical wire having one end connected to the control unit and extending from the control unit to the first jaw member through the double hinge.

In one embodiment, the actuator is secured to an actuator receiving face of the first jaw member.

In one embodiment, the facing accessory further comprises a first electrical connector secured to the actuator receiving face of the first jaw member and electrically connected to the at least a first electrical wire, and a second electrical connector secured to the actuator, the first and second electrical connectors being electrically connected together when the actuator is secured to the actuator receiving face of the first jaw member in order to electrically connect the control unit to the actuator.

In one embodiment, the tool holder comprises a telescopic arm for enabling movement of the facing tool towards and away from the shaft mounting portion along the radial axis, the telescopic arm comprising at least: a first section secured to the shaft mounting portion and extending radially away from the shaft mounting portion; and a second section extending along the radial axis and slidably connected to the first section to allow a translation of the second section relative to the first section along the radial axis, the facing tool being securable to the second section.

In one embodiment, the actuator comprises a drive assembly, a transmission assembly operatively connected to the drive assembly, and a screw shaft, the second section of the telescopic arm comprising a threaded opening on a side facing the shaft mounting portion, a first end of the screw shaft being operatively connected to the transmission assembly and a second end of the screw shaft being threadingly engaged in the threaded opening.

In one embodiment, the drive assembly comprises a motor and a drive gear operatively connected to the motor so that activation of the motor triggers rotation of the drive gear.

In one embodiment, the facing accessory of claim 29, wherein the transmission assembly comprises a gear box operatively connected to the drive gear, the gear box comprising at least one driven gear and the first end of the screw shaft being secured to one of the at least one driven gear so that a rotation of the drive gear drives a rotation of the screw shaft, and thereby a translation of the second section along the radial axis.

In one embodiment, the telescopic arm further comprises a third section slidably secured to the first and second sections between the first and second sections so that a translation of the second section drives a translation of the third section along the radial axis.

In one embodiment, the first section comprises a first guide recess and the third section comprises a first protrusion slidably engaged within the first recess, and the second section comprises a second guide recess and the third section comprises a second protrusion slidably engaged within the second recess.

In one embodiment, the first section further comprises a first rack groove extending from the first recess along the radial axis and a first guide rack inserted within the first rack groove, the second section comprises a second rack groove extending from the second recess along the radial axis and a second guide rack inserted within the second rack groove, and the third section comprises an aperture extending therethrough along the longitudinal axis and a synchronization gear rotatably secured within the aperture, the synchronization gear being operatively connected to the first and second guide racks to control an extension of the second and third sections.

In one embodiment, the third section comprises a first guide groove adjacent to the first protrusion and the first section comprises a first tenon projecting therefrom and slidably engaged within the first guide groove, and the third section comprises a second guide groove adjacent to the second protrusion and the second section comprises a second tenon projecting therefrom and slidably engaged within the second guide groove, the first and second guide groove each having a predefined length for limiting a translation of the third section relative to the first section and a translation of the second section relative to the second section, respectively.

BRIEF DESCRIPTION OF THE DRAWINGS

In order that the invention may be readily understood, embodiments of the invention are illustrated by way of example in the accompanying drawings, in which.

DETAILED DESCRIPTION

Figure 1:
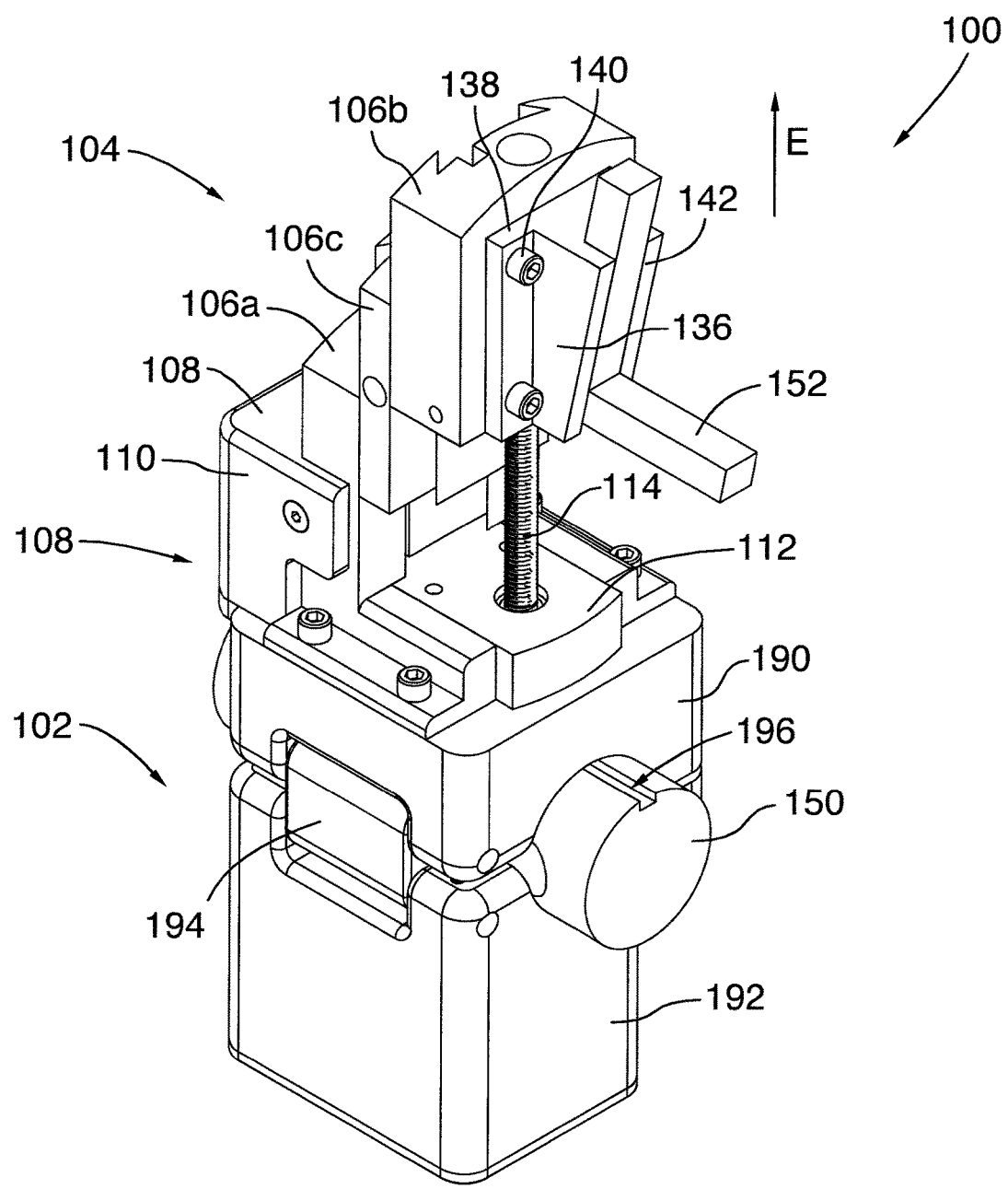
FIG. 1 is a drawing which shows a front perspective view of a facing accessory comprising a tool holder and a shaft mounting portion for a portable boring apparatus, in accordance with one embodiment, with the accessory mounted on a shaft of the portable boring apparatus.
Figure 2:
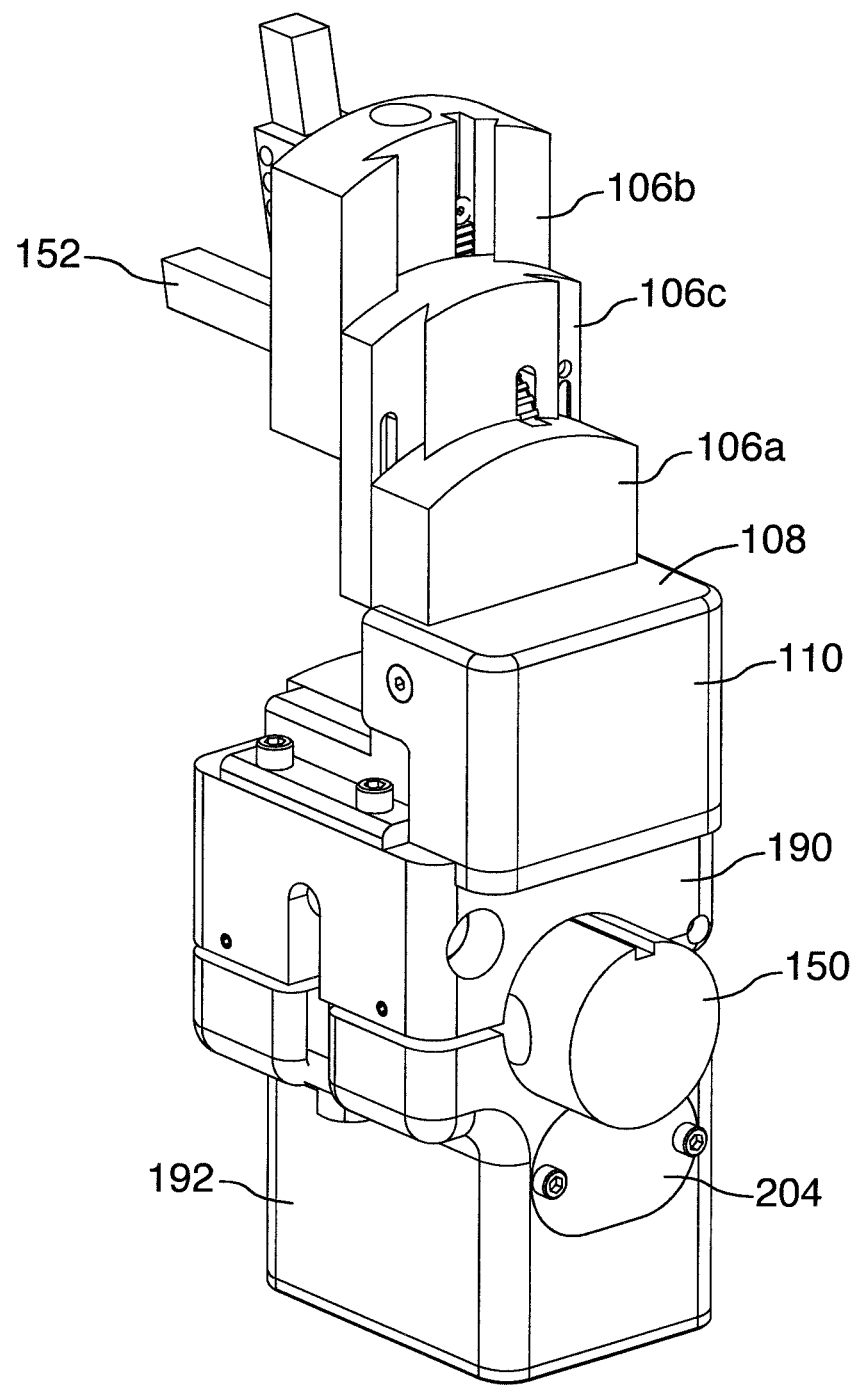
FIG. 2 is a drawing which shows a back perspective view of the facing accessory shown in FIG. 1.
Figure 3:
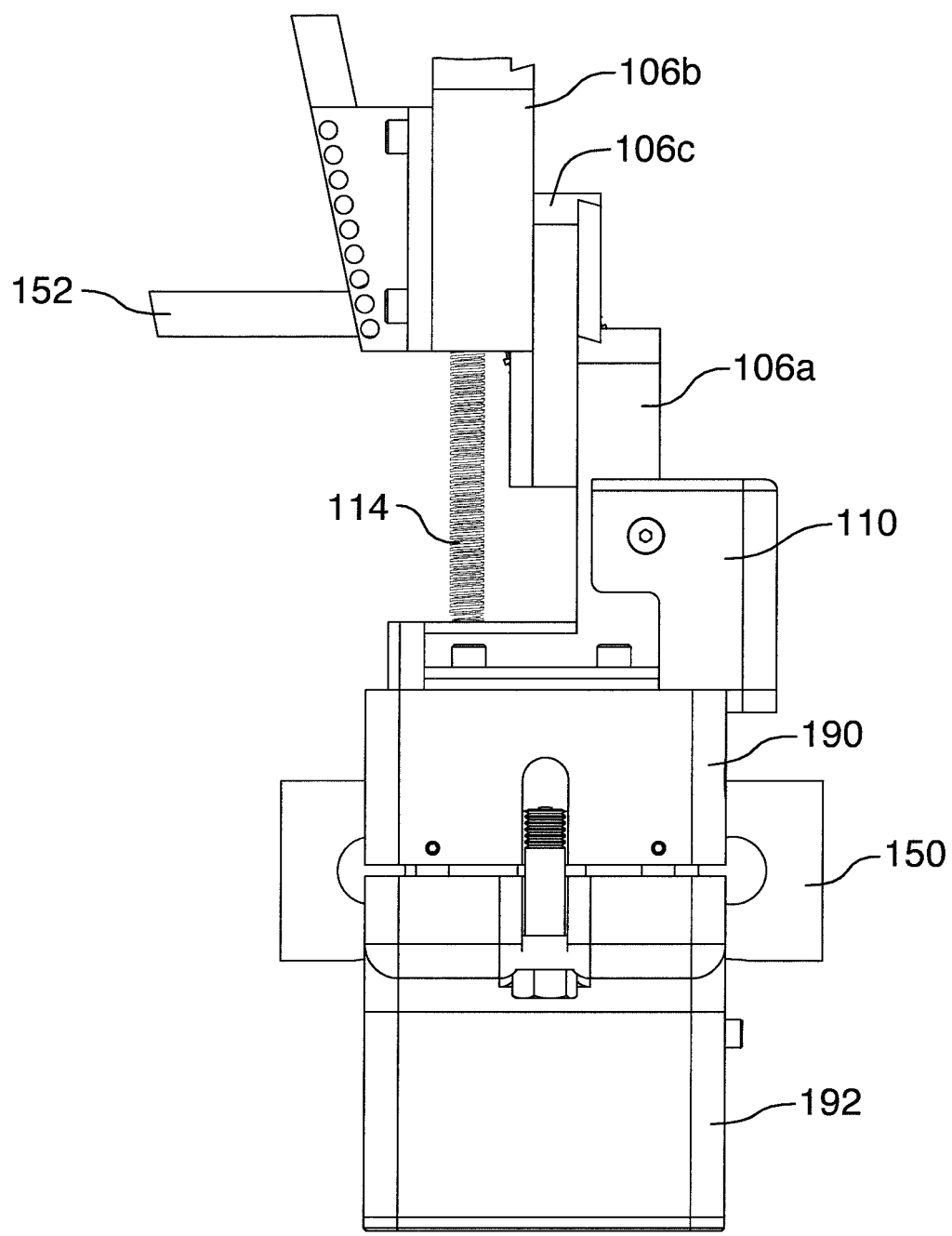
FIG. 3 is a drawing which shows a left side elevation view of the facing accessory shown in FIG. 1.
Figure 4:
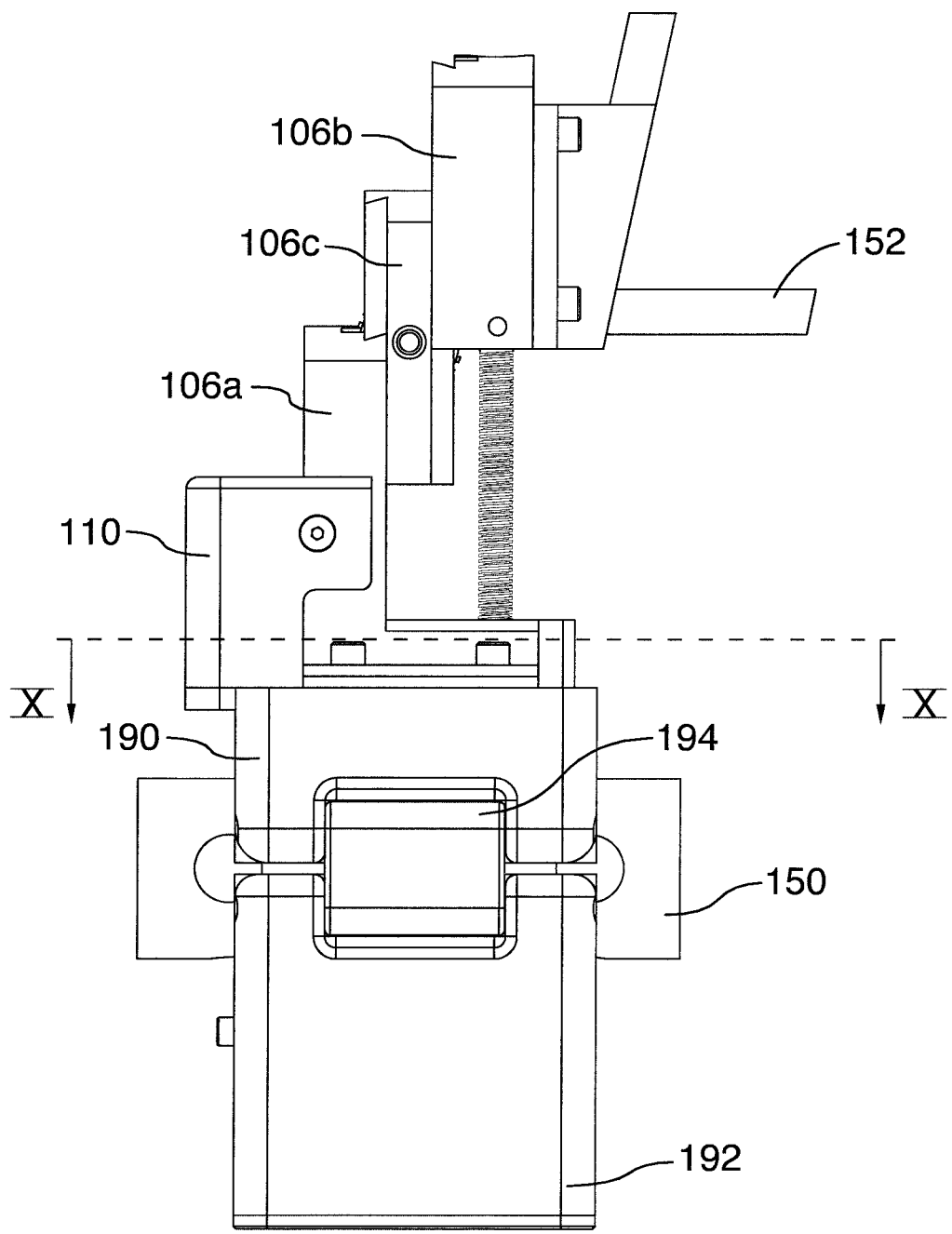
FIG. 4 is a drawing which shows a right side elevation view of the facing accessory shown in FIG. 1.

In the following description of the embodiments, references to the accompanying drawings are by way of illustration of an example by which the invention may be practiced. It will be understood that other embodiments may be made without departing from the scope of the invention disclosed.

Referring to FIGS. 1 to 5, there is shown a facing accessory 100 for a portable boring apparatus, in accordance with one embodiment. The portable boring apparatus comprises a shaft 150 and rotating means (not shown) for rotating the shaft 150. The portable boring apparatus further comprises securing means (not shown) for temporarily securing the portable boring apparatus to the workpiece such that the shaft 150 extends along a longitudinal axis of the bore of the workpiece.

In the following description, the term "radially" refers to a direction which is orthogonal to the shaft 150 when the facing accessory is mounted on the shaft 150 of the portable boring apparatus. Specifically, the term "radially inwardly" refers to a direction towards the shaft 150 when the facing accessory is mounted on the shaft 150 of the portable boring apparatus. Similarly, the term "radially outwardly" refers to a direction away from the shaft 150 when the facing accessory is mounted on the shaft 150 of the portable boring apparatus.

Furthermore, the terms "up", "upper" and "upwardly" refer to a direction away from the workpiece in an axial direction relative to the shaft 150 when the facing accessory is mounted to the shaft 150 of a portable boring apparatus. Similarly, the terms "down", "lower", "downwardly" refer to a direction towards the workpiece in an axial direction relative to the shaft 150 when the facing accessory is mounted to the shaft 150.

The facing accessory 100 comprises a shaft mounting portion 102 adapted for securing the facing accessory 100 to the shaft 150 and a tool holder 104 extending radially away from the shaft mounting portion 102 for holding a facing tool 152 adapted for performing a facing operation. The facing accessory 100 further comprises an actuator portion 108 operatively connected to the tool holder 104 for moving the facing tool 152 radially relative to the shaft 150.

The facing accessory 100 is adapted to move the facing tool 152 radially relative to the shaft 150 during a facing operation. In one example, the facing tool is initially located near the shaft 150 and is moved away from the shaft 150 during the facing operation. In another example, the facing tool 152 is initially located away from the shaft 150 and is moved towards the shaft 150 during the facing operation. In yet another example, the facing tool 152 could be moved alternatively towards the shaft 150 and away from the shaft 150 during the same facing operation.

In the illustrated embodiment, the tool holder 104 comprises a plurality of sections 106a, 106b, 106c that form a telescopic assembly. Sections 106b and 106c are adapted to move relative to each other and relative to section 106a, radially towards and away from the shaft mounting portion 102 along an extension axis E. In the illustrated embodiment, the tool holder 104 comprises a first section 106a secured to the shaft mounting portion, a second section 106b having the facing tool 152 secured thereto and a third section 106c slidably connecting the first section 106a to the second section 106b.

Still in the illustrated embodiment, the first, second and third sections 106a, 106b, 106c are adapted to move in a telescopic fashion during a facing operation to extend further away from the shaft 150 than if the facing accessory 100 did not comprise the first, second and third sections 106a, 106b, 106c, as will be further explained below.

Still in the illustrated embodiment, the facing accessory 100 further comprises the actuator portion 108 for actuating the tool holder 104. In the illustrated embodiment, the actuator portion 108 comprises a drive assembly 110, a transmission assembly 112, and a screw shaft 114. The drive assembly 110 comprises a motor for rotating the screw shaft 114 via the transmission assembly 112 which comprises a gear box, as described in greater detail below. The drive assembly 110 is secured to the section 106a while the transmission assembly 112 is secured to the shaft mounting portion 102. The transmission assembly 112 is operatively connected to the drive assembly 110 so that activation of the motor activates the transmission assembly 112. The screw shaft 114 is operatively connected to the transmission assembly 112 so that the drive assembly contained in the drive assembly 110 rotates the screw shaft 114. The screw shaft 114 threadingly engages the second section 106b of the tool holder 104 to move the second section 106b in translation away from or towards the shaft mounting portion 102 when the screw shaft 114 is rotated by the motor, depending on the rotation direction of the screw shaft 114.

In one embodiment, the drive assembly 110 is integral with the section 106a while the transmission assembly 112 is secured to the shaft mounting portion 102.

Figure 6:
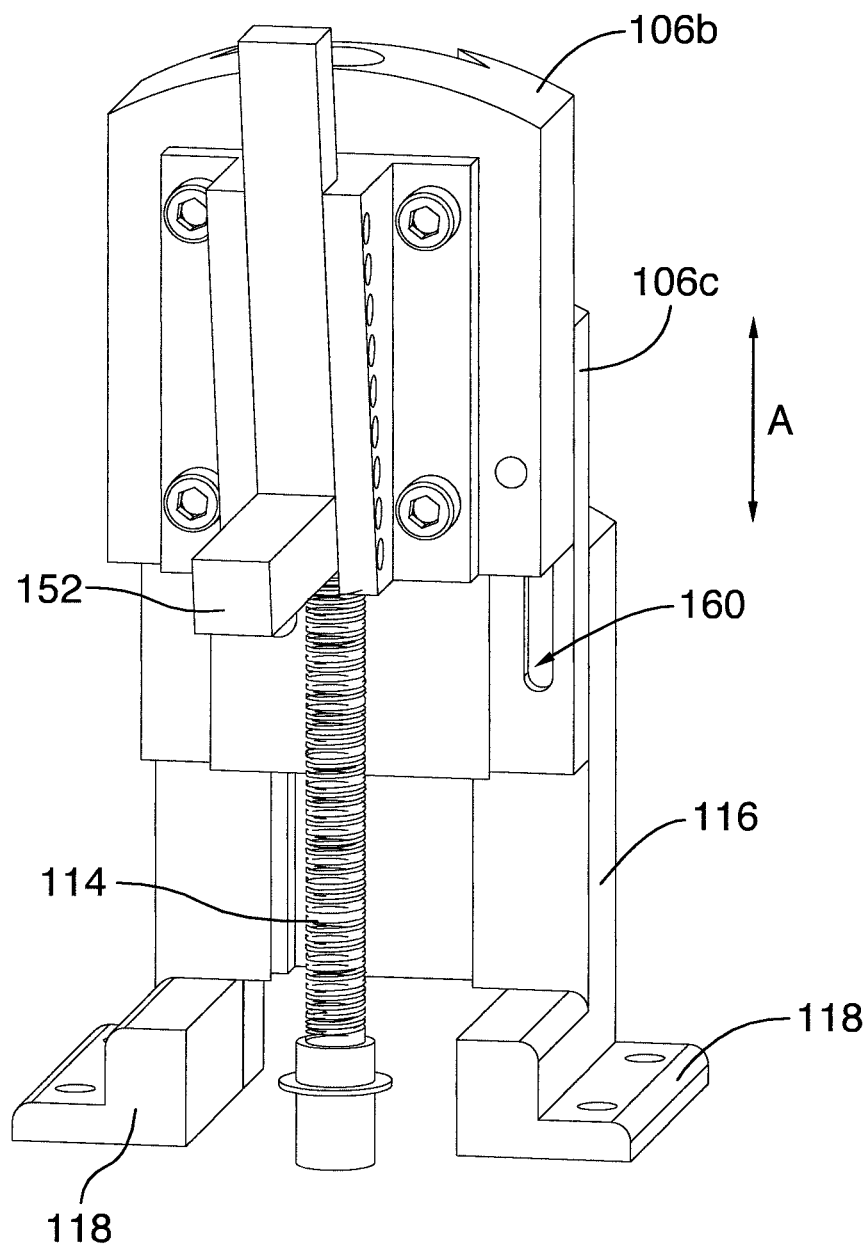
FIG. 6 is a drawing which shows a front perspective view of the tool holder of the facing accessory shown in FIG. 1.
Figure 7:
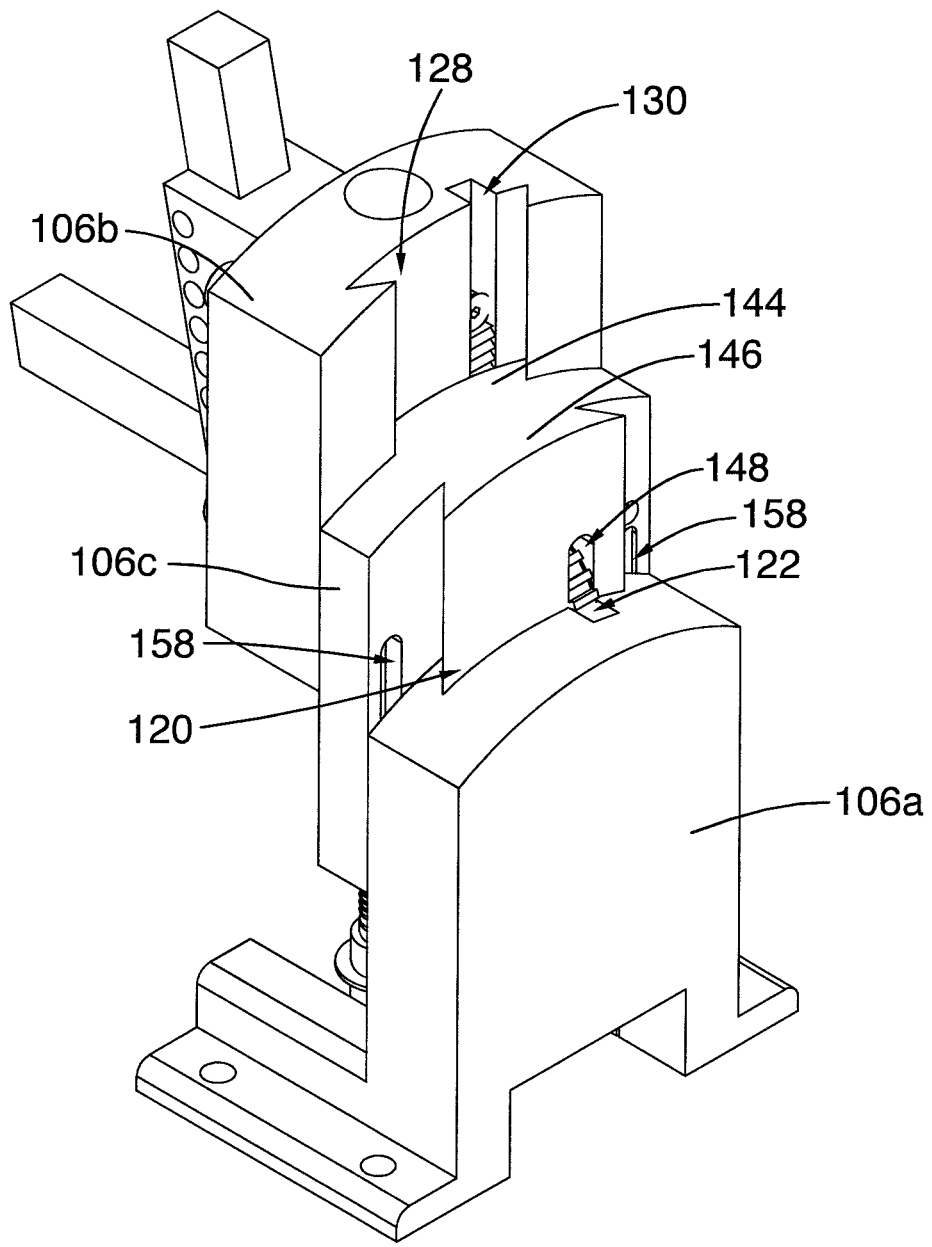
FIG. 7 is a drawing which shows a back perspective view of the tool holder shown in FIG. 6.

Now turning to FIGS. 6 and 7, the tool holder 104 will now be described, in accordance with the illustrated embodiment.

In the illustrated embodiment, the first section 106a comprises a bracket portion 116 which extends orthogonally to the shaft mounting portion 102, away from the shaft mounting portion 102, and a pair of legs 118 which are each secured to the shaft mounting portion 102. The bracket portion 116 extends between top and bottom faces, front and back faces, and opposite side faces, and has a generally rectangular shape. The bottom face of the bracket portion 116 faces the shaft mounting portion 102 and the front face faces the facing tool 152, when secured to the facing accessory 100. The legs 118 extend from the bottom face of the bracket portion 116 towards the facing tool 152, each adjacent to a respective side face of the bracket portion 116.

The space between the two legs 118 and between the bottom face of the bracket portion 116 and the shaft mounting portion 102 is sized and shaped to receive the transmission assembly therein. As a result, the transmission assembly 112 is secured to the shaft mounting portion 102 and extends between the legs 118 and below the bracket portion 116 of the section 106a in order to operatively connect the actuator portion 108 and the screw shaft 114.

A longitudinal guide recess 120 extends in the front face of the bracket portion 116 between the top and bottom ends of the bracket portion 116. The longitudinal guide recess 120 tapers inwardly from the front face towards the back face of the bracket portion 116 to form a trapezoid-shaped recess, and has a substantially constant cross-section from the top face to the back face of the bracket portion 116. The longitudinal guide recess 120 is configured to act as a mortise to guide the third section 106c along a linear path of travel towards and away from the shaft mounting portion 102, as will be further explained below.

A longitudinal groove 122 is also disposed in the longitudinal guide recess 120 and extends further inwardly into the bracket portion 116 towards the back face of the bracket portion. The longitudinal groove 122 is adapted to receive an upper guide rack 124 which is used to control the extension of the second and third sections 106b, 106c relative to the first section 106a, as will be explained further below.

In the illustrated embodiment, the longitudinal groove 122 of the first section 106a is substantially rectangular and the upper guide rack 124 has a generally rectangular cross-section sized and shaped to snuggly fit within the longitudinal groove 122. Still in the illustrated embodiment, the upper guide rack 124 only does not extend the full length of the bracket portion, and is spaced longitudinally from both the top and bottom faces of the bracket portion 116. Alternatively, the upper guide rack 124 could instead extend the full height of the bracket portion 116 from the back face to the bottom face of the bracket portion 116.

Still in the illustrated embodiment, the upper guide rack 124 is secured to the bracket portion 116 of the first section 106a using a fastener 126 which engages both the upper guide rack 124 and the bracket portion 116. Alternatively, the upper guide rack 124 could be secured to the bracket portion 116 using other means known to the skilled addressee, such as welding, gluing or the like. In yet another embodiment, the upper guide rack 124 could be machined directly into the bracket portion 116, rather than being provided as a distinct element.

The second section 106b extends between top and bottom faces, front and back faces, and opposite side faces, and has a generally rectangular shape. The bottom face of the second section 106b faces the shaft mounting portion 102 and the front face of the second section 106b faces the facing tool 152, when secured to the facing accessory 100.

In the illustrated embodiment, a bore (not shown) extends inwardly into the second section 106b from the outer sidewall at the back face of the second section 106b, along an axis A which is generally parallel to the front and back faces. When the tool holder 104 is assembled, the second section 106b is disposed such that the axis A of the bore is parallel to the extension direction E of the tool holder 104. In this embodiment, the second section 106b also comprises a threaded bushing (not shown) which coaxially engages the bore and which is located within the bore. The threaded bushing is secured inside the bore to prevent it from moving axially, using securing means known to the skilled addressee such as one or more fasteners, welding, gluing or the like. The threaded bushing is sized and shaped to receive the screw shaft 114 therein.

Alternatively, the bore could comprise an inner wall which is threaded. In this case, the second section 106b would not comprise a threaded bushing and the screw shaft 114 is directly received in the threaded bore.

A longitudinal guide recess 128 extends in the back face of the second section 106b between the top and bottom faces of the second section 106b. The longitudinal guide recess 128 tapers inwardly from the top face towards the bottom face of the second section 106b to form a trapezoid-shaped recess, and has a substantially constant cross-section from the top face to the bottom face of the second section 106b. The longitudinal guide recess 128 is configured to act as a mortise to guide the second section 106b along a linear path of travel towards and away from the shaft mounting portion 102, as will be further explained below.

A longitudinal groove 130 is also disposed in the longitudinal guide recess 128 and extends further inwardly into the second section 106b towards the front face of the second section 106b. The longitudinal groove 130 is adapted to receive a lower guide rack 132 which, similarly to the upper guide rack 124, is used to control extension of the second and third sections 106b, 106c relative to the first section 106a, as will be explained further below.

In the illustrated embodiment, the longitudinal groove 130 of the second section 106b is generally rectangular and the lower guide rack 132 has a generally rectangular cross-section sized and shaped to snuggly fit within the longitudinal groove 130.

Still in the illustrated embodiment, the lower guide rack 132 is secured to the second section 106b using a fastener 134 which engages both the lower guide rack 132 and the second section 106b. Alternatively, the lower guide rack 132 could be secured to the second section 106b using other means known to the skilled addressee, such as welding, gluing or the like. In yet another embodiment, the lower guide rack 132 could be machined directly into the second section 106b, rather than being provided as a distinct element.

The facing tool 152 is secured to the second section 106b via a tool holding bracket 136. The tool holding bracket 136 is configured to receive and firmly hold the facing tool 152 in a predetermined orientation during a facing operation. In the illustrated embodiment, the tool holding bracket 136 comprises a generally planar mounting portion 138 which extends parallel to the front face of the second section 106b and which is secured thereto by a plurality of fasteners 140. The tool holding bracket 136 further comprises a pair of parallel holding walls 142 extending orthogonally from the mounting portion 138, away from the second section 106b. The holding walls 142 are spaced apart to define a receiving gap for receiving the facing tool 152 therebetween.

While in the illustrated embodiment, the tool holding bracket 136 is removably secured to the second section 106b, it should be understood that other configurations may be possible. For example, the tool holding bracket 136 may be fixedly secured to the second segment 106b. In another example, the tool holding bracket 136 may be integral with the second segment 106b.

While in the illustrated embodiment the facing tool 152 is removably received in the tool holding bracket 136, it should be understood that other configurations may be possible. For example, the facing tool 152 may be integral with the tool holding bracket 136 or fixedly secured to the tool holding bracket 136. In another example, the tool holding bracket 136 may be omitted and the facing tool 152 may be integral with the second segment 106b.

The facing tool 152 may further be held using one or more fasteners such as bolts of set screws, which can also be used to position the facing tool 152 to a desired position or to one of a plurality of predetermined positions relative to the tool holding bracket 136.

The third section 106c extends between top and bottom faces, front and back faces, and opposite side faces, and has a generally rectangular shape. The bottom face of the third section 106c faces the shaft mounting portion 102 and the front face of the third section 106b faces the facing tool 152, when secured to the facing accessory 100.

Figure 5:
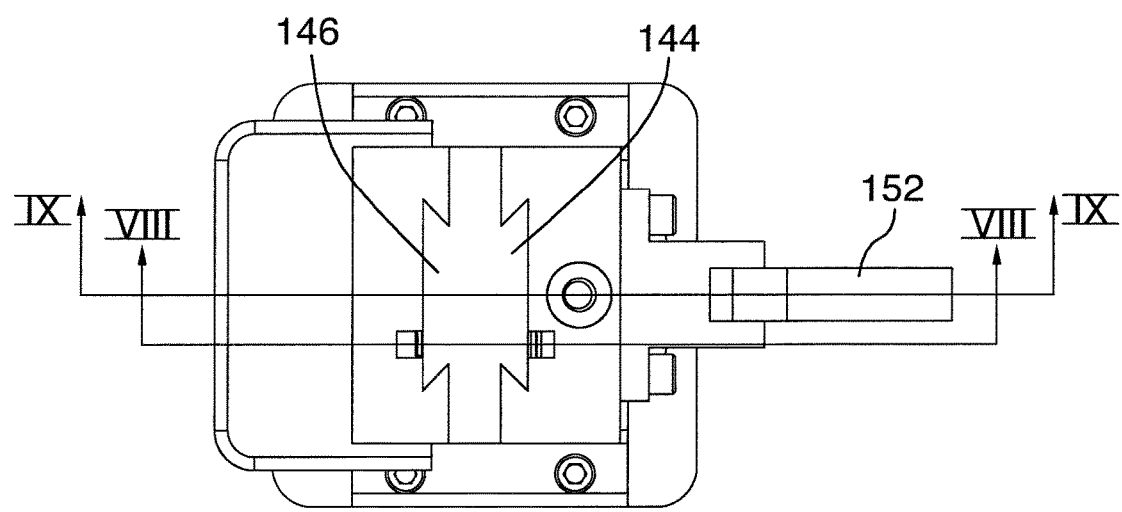
FIG. 5 is a drawing which shows a top plan view of the facing accessory shown in FIG. 1.

A pair of top wedge-shaped corner recesses extends from the top corners of the front face of the third section 106c inwardly towards the center of the third section 106c to form a trapezoid-shaped protrusion 144 which protrudes from the front face of the third section 106c. As best shown in FIG. 5 the top corner recesses define a front flaring tenon portion 144 sized and shaped to slidably engage the longitudinal guide recess 128 of the second section 106b.

Similarly, a pair of bottom wedge-shaped recesses extends from the back corners of the third section 106c inwardly towards the center of the third section 106c to form a trapezoid-shaped protrusion 146 which protrudes from the front face of the third section 106c. The bottom recesses define a back tenon portion sized and shaped to slidably engage the longitudinal guide recess 120 of the first section 106a.

The third section 106c further comprises an aperture 148 generally orthogonal to the back and front faces which extends through the third section 106c between the back and front faces. The third section 106c further comprises an axle 154 extending between the sidewalls of the aperture 148, orthogonal to the extension direction E, and a synchronization gear 156 which is mounted to and rotates about the axle 154. The synchronization gear 156 therefore rotates in a rotation plane which is parallel to the extension direction E of the tool holder 104.

Figure 9:
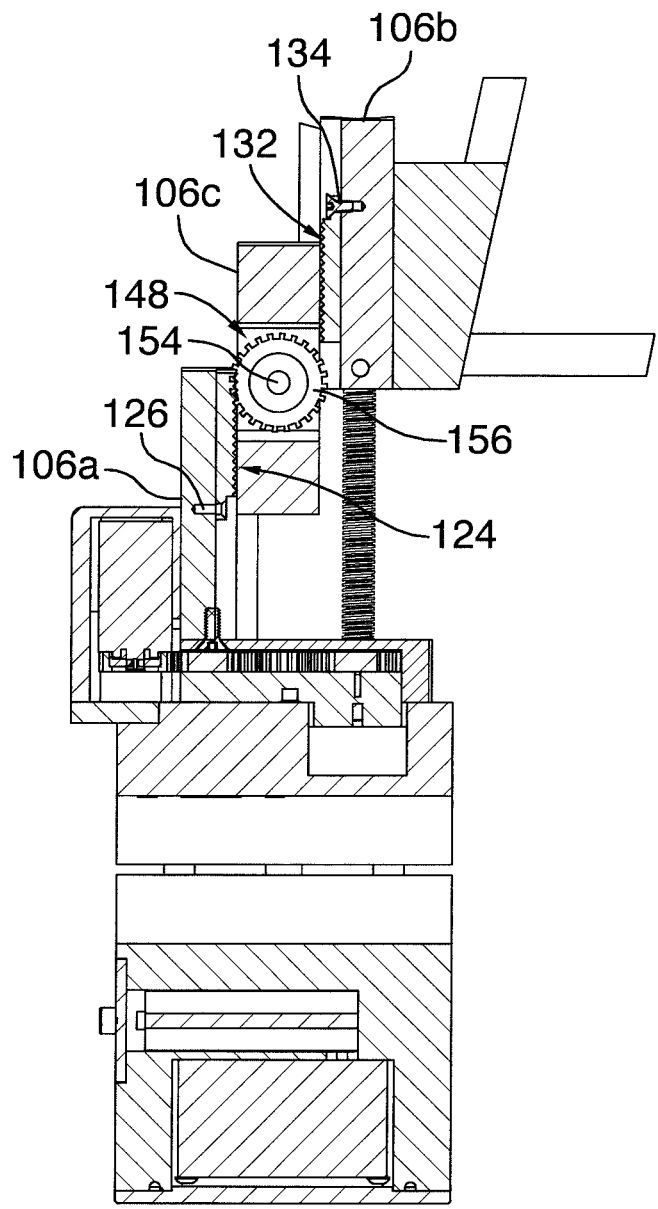
FIG. 9 is a drawing which shows a cross-section view, taken along line IX-IX of FIG. 5, of the facing accessory shown in FIG. 1.

The synchronization gear 156 is sized and shaped to engage the upper guide rack 124 of the first section 106a and the lower guide rack 132 of the second section 106b, as best shown in FIG. 9 This configuration allows the synchronization gear 156 to control the extension of the second and third sections 106b, 106c. Upon rotation of the screw shaft 114 in a given direction, the second section 106b may be moved away from the shaft mounting portion 102, for example, The displacement of the second section 106b triggers the rotation of the synchronizing gear 156 and the displacement of the third section 106c relative to the shaft mounting portion 102.

In one embodiment, at least the characteristics of the synchronization gear 156, the upper guide rack 124, and the lower guide rack 132 are chosen to synchronize the motion of the second and third sections 106b and 106c. In an embodiment in which the second and third section 106b and 106c have substantially the same height, i.e. the same length along the axis E, the characteristics of the synchronization gear 156, the upper guide rack 124, and the lower guide rack 132 may be chosen so that the displacement speed of the second section 106b may be substantially twice that of the third section 106c. In this case, the second and third section 106b and 106c reach the end of their respective stroke substantially concurrently, i.e. the strokes of the second and third sections 106b and 106c is said to be synchronized.

The back face of the third section 106c further comprises two substantially rectangular grooves 158 each extending adjacent and along a portion of a respective side face of the third section 106c. Each groove 158 is adapted to slidably receive a respective tenon (not shown) which projects from the front face of the first section 106a. The position of the grooves 158 along the length of the side faces of the third section 106c and the length of the grooves 158 are chosen to control the translation of the third section 106c relative to the first section 106a, and therefore the extension of the third section 106c relative to the first section 106a.

Similarly, the front face of the third section 106c comprises a groove 160 extending adjacent and along a portion of a side face of the third section 106c. The groove 160 is adapted to slidably receive a tenon (not shown) which projects from the back face of the second section 106b. The position of the groove 160 along the length of the side face of the third section 106c and the length of the groove 160 are chosen to control the translation of the second section 106b relative to the third section 106c, and therefore the extension of the second section 106b relative to the third section 106c.

Figure 8:
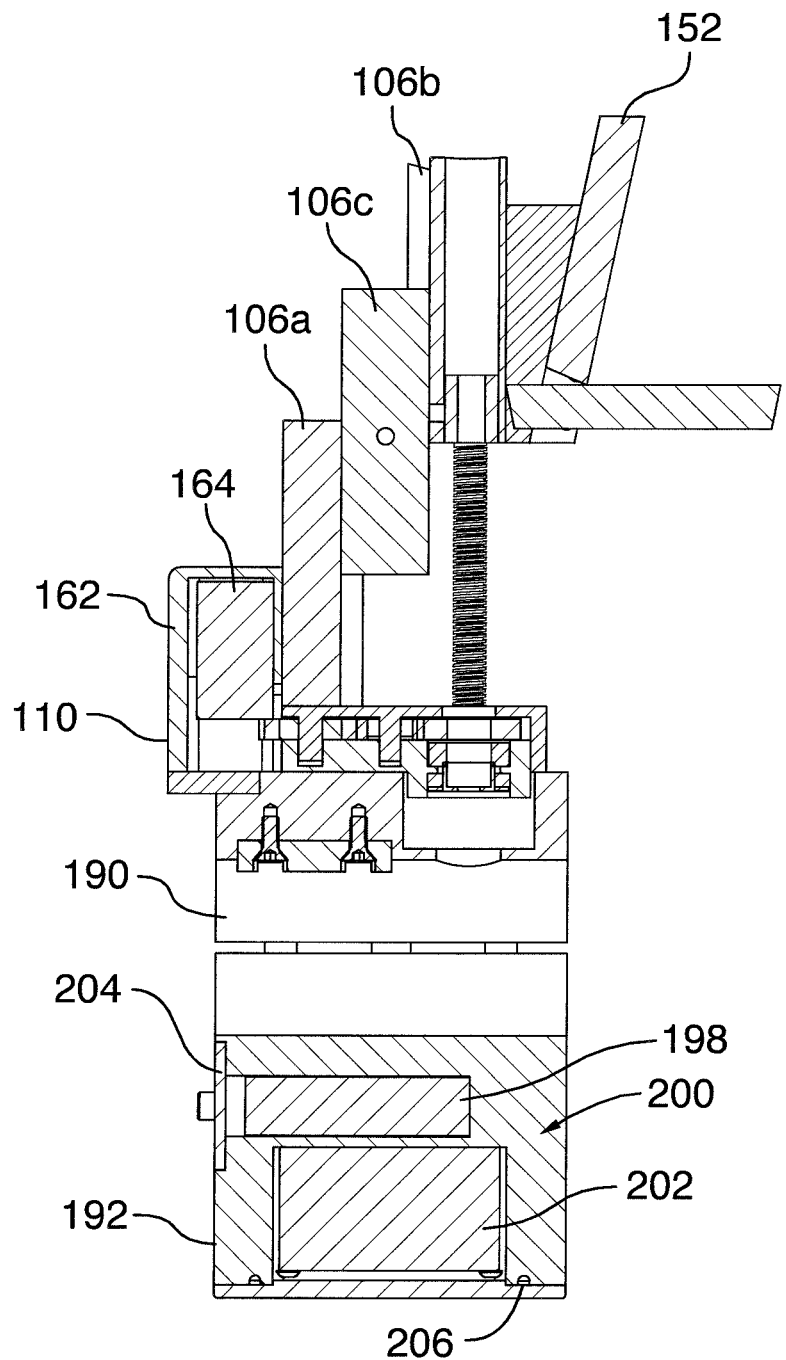
FIG. 8 is a drawing which shows a cross-section view, taken along line VIII-VIII of FIG. 5, of the facing accessory shown in FIG. 1.
Figure 10:
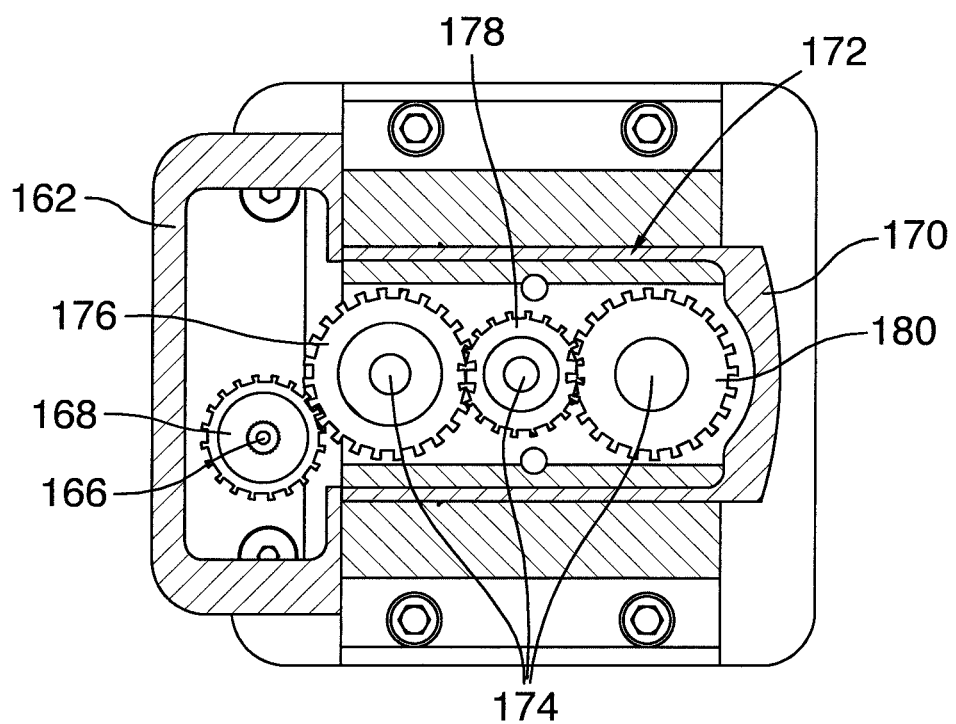
FIG. 10 is a drawing which shows a cross-section view, taken along line X-X of FIG. 4, of the facing accessory shown in FIG. 1.

Turning now to FIGS. 8 and 10, the actuator portion 108 and the transmission assembly 112 will now be described in further details.

In the illustrated embodiment, the actuator portion 108 comprises a housing 162 which is secured to the first section 106a of the tool holder 104 and to the shaft mounting portion 102. An electric motor 164 is housed in the housing 162.

Still in the illustrated embodiment, the motor 164 has a drive shaft 166 and a drive gear 168 mounted to the drive shaft 166. The motor 164 is disposed such that the drive shaft 166 extends parallel to the extension direction E.

In the illustrated embodiment, the transmission assembly 112 comprises a housing 170 which is secured to the shaft mounting portion 102 between the legs 118 of the first section 106a. A substantially flat gearbox 172 is housed in the housing 170. The gearbox 172 comprises a plurality of axles 174 along the extension direction E from a bottom inner wall of the housing 170. The gearbox 172 further comprises three driven gears 176, 178, and 180 which are housed within the housing 170, each one of the driven gears 176, 178, and 180 being mounted on a respective axle 174. It should be understood that the number of driven gears 176, 178, and 180 contained in the gearbox 172 may vary. The screw shaft 114 is operatively connected to the driven gear 180 so that a rotation of the driven gear 180 be transmitted to the screw shaft 114.

The gears 168, 176, 178, and 180 are intermeshed to transmit rotation from the drive shaft 166 of the motor 164 to the screw shaft 114. The drive gear 168 of the motor 164 is intermeshed with the driven gear 176 which is intermeshed with the driven gear 178. The driven gear 178 is also intermeshed with the driven gear 180. The gears 168, 176, 178, and 180 are all disposed in a common plane such that actuation of the motor 164 imparts rotation to the drive gear 168, which imparts rotation to the driven gear 176, which in turn imparts rotation to the driven gear 176, which in turns imparts rotation to the driven gear 180.

It will be understood that the number of driven gears may vary and that the size and shape of the drive gear 168 and the driven gears 176, 178, and 180 may be selected according to a desired gear ratio and/or torque ratio.

As best shown in FIG. 9 the screw shaft 114 is aligned coaxially with the third driven gear 180. The screw shaft 114 has a first end located towards the gearbox and secured to the third driven gear 180, and a second end which engages the second section 106b of the tool holder 104. Specifically, the second end threadingly engages the threaded bushing of the second section 106b. Alternatively, if the second section 106b comprises a threaded bore instead of a threaded bushing, then the second end would threadingly engage the threaded bore of the second section 106b.

Since the first end of the screw shaft 114 is secured to the driven gear 180, the screw shaft 114 is prevented from moving axially. Furthermore, the screw shaft 114 is secured to the driven gear 180 using means known to the skilled addressee, such that it is prevented from rotating relative to the driven gear 180. Rotation of the driven gear 180 will therefore cause rotation of the screw shaft 114, which in turn will cause translation of the second section 106b radially towards or away from the shaft mounting portion 102.

Now referring to FIGS. 1, 2, 3, and 4, the shaft mounting portion 102 will now be described.

In the illustrated embodiment, the shaft mounting portion 102 comprises a first jaw member 190 and a second jaw member 192 hingeably connected to the first jaw member 190. The first jaw member 190 extends between a top face to which the tool holder 104 is secured and a bottom face which comprises an inner recess adapted to receive the shaft 150. The second jaw member 192 extends between a top face which comprises an inner recess adapted to receive the shaft 150, and a bottom face. The first and second jaw members 190 and 192 are hingeably secured together via a double hinge 194.

It should be understood that any adequate connection that allow to hingeably secure together the first and second jaw members 190 and 192 may be used.

For example, in the illustrated embodiment, the shaft 150 is cylindrical. The recesses formed in the bottom face of the first jaw member 190 and in the top face of the second jaw member 192 are therefore semi-cylindrical such that they form together a cylindrical bore when the shaft mounting portion is closed, i.e. when the first and second jaw members are secured together, and the cylindrical bore is sized and shaped to fit snuggly around the shaft 150.

Alternatively, if the shaft 150 is not cylindrical and instead has a different shape and cross-section, the recesses may also be shaped differently according to the shape and size of the shaft 150.

Still in the illustrated embodiment, the first jaw member 190 comprises a key (not shown) adapted to engage a corresponding longitudinal keyway 196 of the shaft 150 to thereby prevent rotation of the facing accessory 100 relative to the shaft 150 during rotation of the shaft 150. Therefore, when the shaft 150 is rotated using the rotation means, the facing accessory 100 rotates at a same rotational speed about the longitudinal axis of the shaft 150 as the rotational speed of the shaft 150.

In the present embodiment, the first jaw member 190 comprises a curved inner sidewall defining its recess, and the key comprises an elongated projection which projects into the recess from the inner sidewall and which extends generally parallel to the shaft 150.

Still in the illustrated embodiment, the key is provided as a distinct element from the first jaw member 190 and is adapted to be fastened to the inner sidewall of the first jaw member 190. Alternatively, the key could instead be machined directly into the inner sidewall of the first jaw member 190. While in the illustrated embodiment, it projects from the first jaw member 190, it should be understood that the key may be located on the second jaw member 192.

In another embodiment, the shaft mounting portion 102 may comprise other means for preventing rotation of the facing accessory 100 relative to the shaft 150 during rotation of the shaft 150. For example, the shaft 150 could have a noncircular cross-section (e.g. square cross-section) and the recesses could be shaped similarly to hold the shaft 150 snuggly and prevent rotation of the facing accessory 100 during rotation of the shaft 150.

Still in the illustrated embodiment, the first and second jaw members 190 and 192 can be temporarily locked together using a locking bolt arrangement. More specifically, the locking bolt arrangement comprises a locking cylinder which is inserted in a cylindrical opening in the first jaw member. The locking cylinder is substantially smooth to be able to rotate within the cylindrical opening and comprises a transverse threaded opening located at about the center of the cylinder.

The locking bolt arrangement further comprises a bolt which comprises a head, a threaded end portion and a smooth portion extending between the head and the threaded end portion. The locking bolt is adapted to be inserted through an eyelet in the second jaw and the threaded end portion of the bolt threadingly engages the transverse threaded opening of the locking cylinder. The bolt is then tightened until the head firmly abuts the eyelet, thereby tightly locking the facing accessory 100 around the shaft 150.

The characteristics of the second jaw member 192 such as its weight, its gravity center, and/or the like are chosen so that it acts as a counterweight for the tool holder 104 during the rotation of the facing accessory 100.

In the illustrated embodiment, the facing accessory 100 further comprises a power source 198 operatively connected to the mounting portion 102. The power source 198 is self-contained within the facing accessory 100, such that the facing accessory 100 does not require an external power source.

In another embodiment, the facing accessory 100 is powered by an external power source. Any adequate device and method for powering the facing accessory 100 known by the person skilled in the art may be used. For example, the facing accessory may be powered from an external power source via a slip ring, a rotary electrical interface, a rotating electrical connector, a collector, a swivel, an electrical rotary joint, or the like, as known in the art.

In the illustrated embodiment, the motor 164 is an electric DC motor and the power source 198 comprises one or more batteries. In this embodiment, the power source 198 and a control unit 202 for controlling the electric DC motor are inserted into the shaft mounting portion 102. More specifically, the second jaw member 192 of the shaft mounting portion 102 comprises an internal chamber 200 which is sized and shaped for receiving the power source 198 and a control unit 202. A wireless communication unit (not shown) is further positioned in the internal chamber 200 of the second jaw member 192 and is adapted to wirelessly receive and/or transmit data. The power source 198 is used for powering the electric motor 164, the control unit 202, and the communication unit.

A first aperture is present in a wall of the second jaw member 192 so that the internal chamber 200 be accessible. A cover 204 removably closes the aperture. For example, the cover 204 can be screwed into the second jaw member 192 to prevent the batteries from exiting the internal chamber. The batteries are secured to the cover 204 further to prevent the batteries from moving relative to the second jaw member 192 during a facing operation. The cover 204 may also prevent debris from entering the internal chamber and damaging the electrical contacts of the batteries themselves, especially during a facing operation.

Still in the illustrated embodiment, a second aperture is present in the second jaw member 192 to provide access to the control unit 202. A second cover 206 closes the second aperture. For example, the cover 206 can be screwed into the second jaw member 192 to prevent the control unit 202 from exiting the internal chamber. The communication unit may also be accessed from the second aperture. In one embodiment, the control unit 202 and the communication unit are secured to the second cover 206 to prevent them from moving relative to the second jaw member 192 during a facing operation.

It should be understood that the first and second aperture may not be present so that the batteries and/or the control unit may not be accessed. For example, the batteries may be rechargeable and only a connector for recharging the batteries secured to a wall of the second jaw member 192 may be accessed.

In one embodiment, the control unit could be used to adjust the movement speed of the second section 106*b* relative to the first section 106*a* of the tool holder 104 and/or control the position in time of the second section 106*b* relative to the shaft mounting portion 102 or the first section 106*a* which is secured to the shaft mounting portion 102. The control unit 202 could also be used to program a specific movement pattern for the second section 106*b*, or a specific extension distance for the second section 106*b* to cover during a facing operation.

The power source 198, the control unit 202, the wireless communication unit, and the motor 164 are electrically connected together using any adequate electrical connectors. In one embodiment, the wireless communication unit comprises a chip secured and operatively connected to the control unit 202 so as to be powered by the power source 198 via the control unit 202. The wireless communication unit allows for any adequate wireless communication such as Wi-Fi communication, Bluetooth communication, and/or the like. In one embodiment, the wireless communication unit uses a specific frequency for receiving and/or transmitting data so that two different facing accessories 100 use different communication frequencies.

Electrical wires electrically connect the motor 164 to the power source 198 and the control unit 202. In one embodiment, at least a portion of the double hinge 194 is hollow so that electrical wires may be introduced from the second jaw member 192 to the first jaw member 190 through the hollow portion of the first jaw member 190. It should be noted that, in this case, at least a portion of the first jaw member 190 is hollow so that the electrical wires may be inserted therein in order to be connected to the motor 164.

In another embodiment, the facing accessory 100 comprises electrical mating connectors to electrically connect the first and second jaw members together, and the first jaw member 190 and the drive assembly 110 together. For example, the second jaw member may comprise a first electrical connector position of its top wall to be in physical contact with the bottom wall of the first jaw member 190 when the shaft mounting portion 102 is secured to the shaft 150. The first electrical connector is electrically connected to the power source 198 and the control unit 202. The bottom wall of the first jaw member 190 also comprises a second electrical connector mating the first electrical connector secured to the top wall of the second jaw member 192. The first and second electrical connectors are positioned so that they connect together when the first and second jaw members 190 and 192 are secured together around the shaft 150.

The top wall of the first jaw member 190 is also provided with a third electrical connector located at a position facing the drive assembly 110. The third electrical connector is electrically connected to the second electrical connector via electrical wires. The bottom wall of the drive assembly 110 is provided with a fourth electrical connector mating the third electrical connector located on the top wall of the first jaw member 190. The fourth electrical connector is electrically connected to the motor 164 via electrical wires. The positions of the third and fourth electrical connectors relative to the top wall of the first jaw member 190 and to the bottom wall of the drive assembly 110, respectively, are chosen so that the third and fourth electrical connectors connect together when the drive assembly is secured to the first jaw member 190 of the shaft mounting portion 102. As a result of the above-described electrical connections, the motor 164 is electrically connected to the power source 198 and the control unit 202, and the motor 164 may be powered by the power source and controlled by the control unit 202.

When the shaft mounting portion 102 is provided with mating electrical connectors for electrically connecting together the first and second jaw members 190 and 192, the double hinge 194 may be omitted so that the first and second jaw members 190 and 192 be independent the one from the other. In this case, a second locking bolt arrangement such as the one described above may replace the double hinge 194. In another example, the mating electrical connectors may comprise attachment means therein and the attachment means may be integral with the mating electrical connectors.

It will be appreciated that in this configuration, movement of the tool holder 104, and therefore of the facing tool 152, is completely independent from the rotation of the shaft 150. This advantageously allows an operator to adjust the movement of the tool holder 104 via the control unit without having to modify the speed and/or torque of rotation of the shaft 150.

Figure 13:
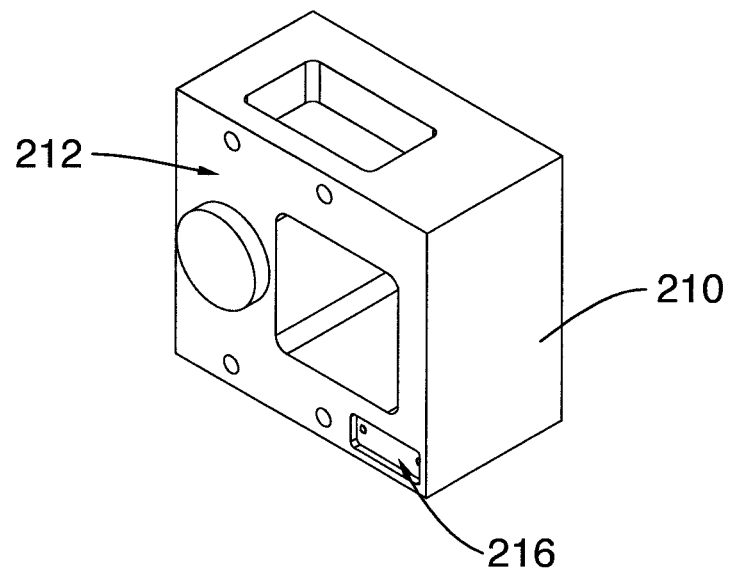
FIG. 13 is a drawing which a show a front perspective view of a spacer to be inserted between the shaft mounting portion and the tool holder of the facing accessory shown in FIG. 1.
Figure 14:
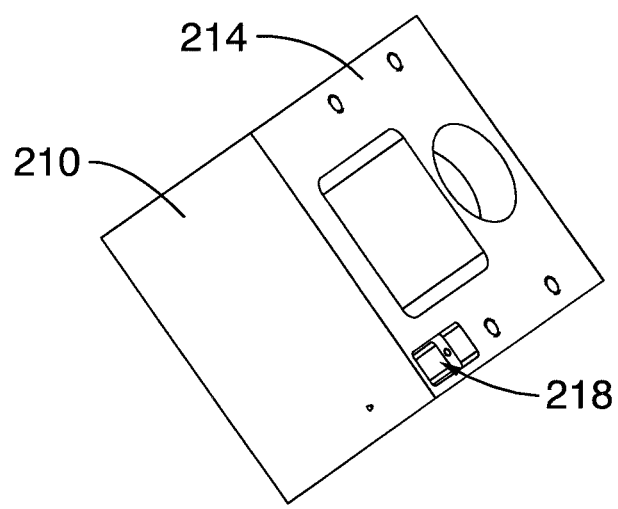
FIG. 14 is a drawing which shows a back perspective view of the spacer shown in FIG. 13.

FIGS. 13 and 14 illustrate one embodiment of a spacer 210 that may be used to further increase the extension length of the tool holder, i.e. to increase the maximum distance between the facing tool 152 and the shaft 150, when the facing tool is secured to the facing accessory 100. The spacer 210 may be seen as an extension of the first jaw member 190 along the radial axis, i.e. along the axis orthogonal to the axis of the shaft 150. The spacer 210 extends between a bottom face 212 to be secured to the top face of the first jaw member 190 and a top face 214 on which the tool holder 104 is to be secured. For example, screws may be used for securing the spacer 210 to the top face of the first jaw member 190, and for securing the tool holder 104 to the top face of the spacer 210. The bottom face 212 of the spacer 210 comprises a fifth electrical connector 216 mating the third electrical connector located on the top face of the first jaw member 190 so that the third electrical connector located on the first jaw member 190 and the fifth electrical connector 216 connect together when the spacer 210 is secured to the top face of the first jaw member 190. The top face of the spacer 210 is provided with a sixth electrical connector 218 mating the fourth electrical connector located on the bottom face of the drive assembly 110 so that the fourth electrical connector provided on the drive assembly 110 and the sixth electrical connector 218 connect together when the tool holder 104 is secured to the spacer 210. The spacer 210 comprises at least one hollow portion for receiving electrical wires which electrically connect together the electrical connectors 216 and 218.

Figure 15:
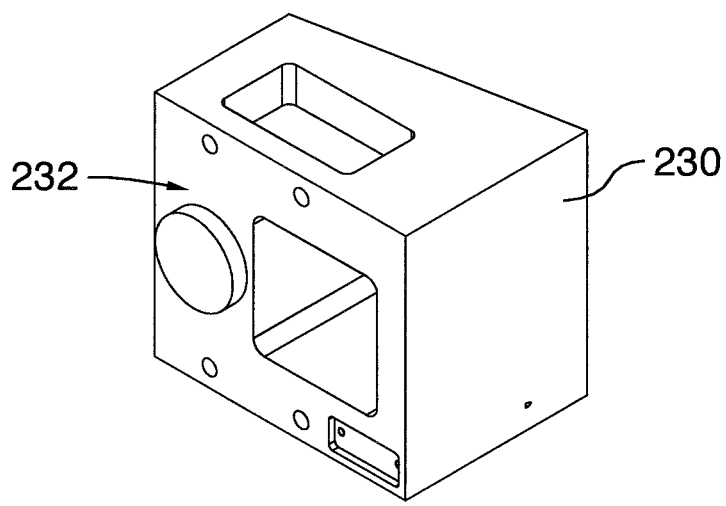
FIG. 15 is a drawing which a show a front perspective view of another embodiment of a spacer to be inserted between the shaft mounting portion and the tool holder of the facing accessory shown in FIG. 1.
Figure 16:
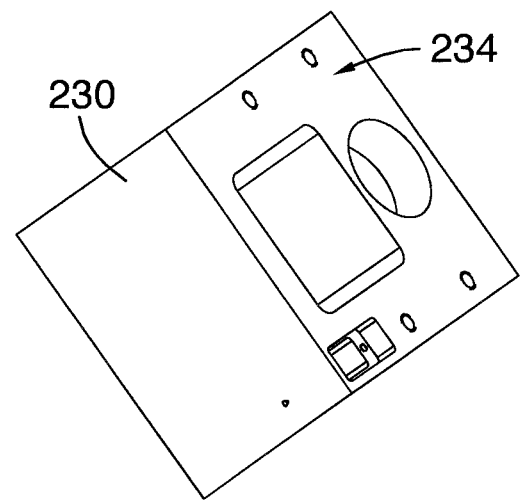
FIG. 16 is a drawing which shows a back perspective view of the spacer shown in FIG. 15.
Figure 17:
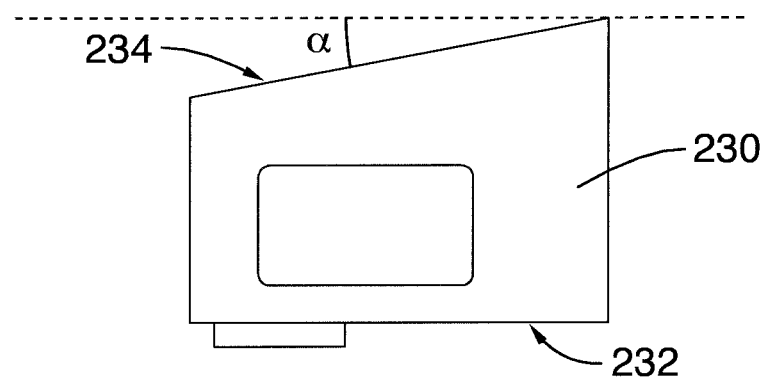
FIG. 17 is a drawing which shows a top view of the spacer shown in FIG. 15.

While the bottom and top faces 212 and 214 of the spacer 210 illustrated in FIGS. 13 and 14 are substantially parallel, it should be understood that other configurations are possible. For example, the bottom and top faces may be angled as illustrated in FIGS. 15-17 that illustrate an angled spacer 230. With respect to the spacer 210, the bottom face 232 and the top face 234 of the angled spacer 230 are angled together, i.e. the plane in which the bottom face 232 is included and the plane in which the top face 234 is included form an angle α, as illustrated in FIG. 17. Since the tool holder 104 is to be mounted substantially orthogonally on the top surface 234 of the spacer 230 and the facing tool 152 is to be mounted substantially orthogonally on the tool holder 104, the facing tool 104 will also form an angle α with the piece to be surfaced. Therefore, the angled spacer 230 allows for surfacing a piece at the angle α. It should be understood that the angle between the bottom and top surfaces 232 and 234 is chosen as a function of the desired surfacing angle.

While in the above description the telescopic arm of the tool holder 104 contains three sections 106a, 106b, and 106c, it should be understood that the number of sections forming the telescopic arm may vary as along as the telescopic arm comprises at least two sections. For example, the section 106c may be omitted so that the telescopic arm only comprises the sections 106a and 106b. In this case, the person skilled in the art will understand that some modifications to the illustrated embodiment must be done. For example, the guide recess 120 extending on the front face of the sections 106a may be replaced by a protrusion such as protrusion 144 adapted to slide in the guide recess 128 present in the back face of section 106b so that section 106b may slide with respect to section 106a. Alternatively, the guide recess 128 present in the back face of section 106b may be replaced by a protrusion such as protrusion 146 adapted to slide in the guide recess 120 of the section 106a. It should also be understood that the grooves 122 and 130 may be omitted. Furthermore, one of the sections 106a and 106b may comprise at least one groove such as groves 158 or 160, and another one of the sections 106a and 106b may comprise a tenon adapted to slide in the groove.

Figure 11:
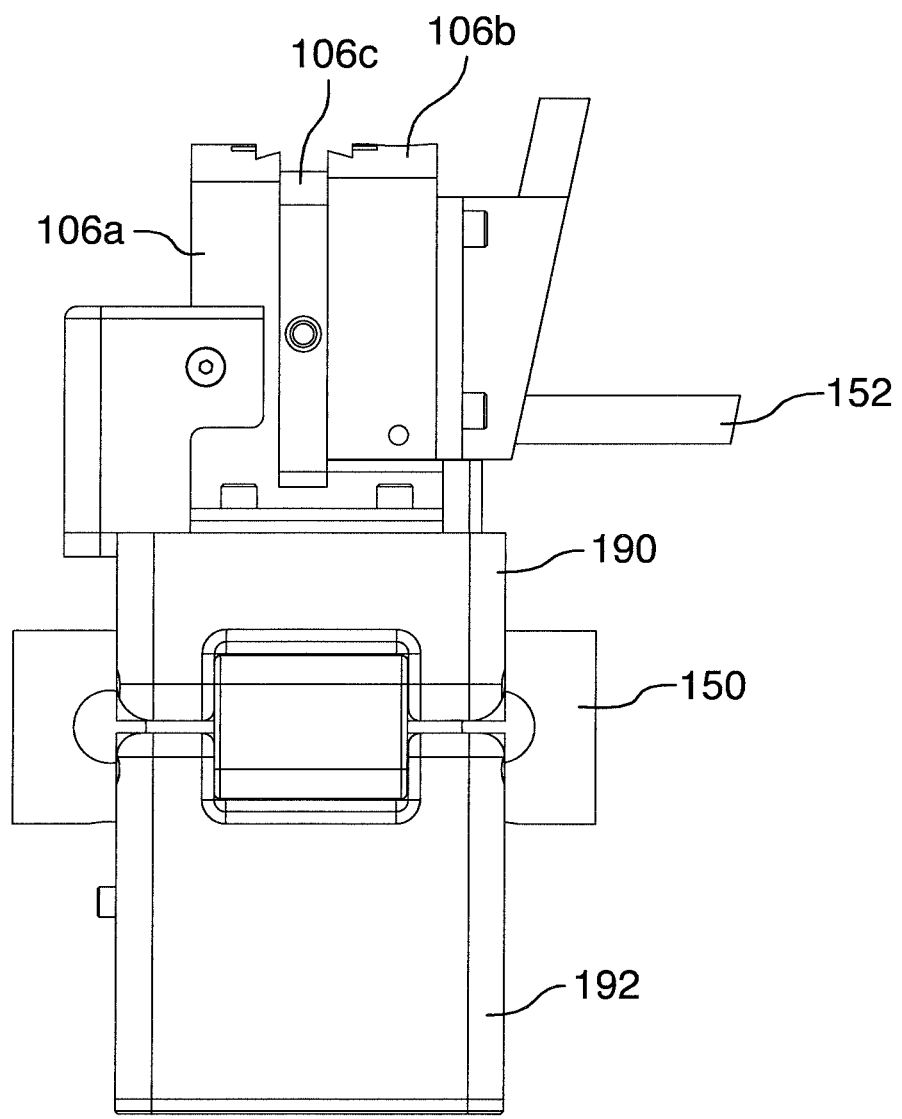
FIG. 11 is a drawing which shows a right side elevation view of the facing accessory shown in FIG. 1, with the tool holder fully retracted.
Figure 12:
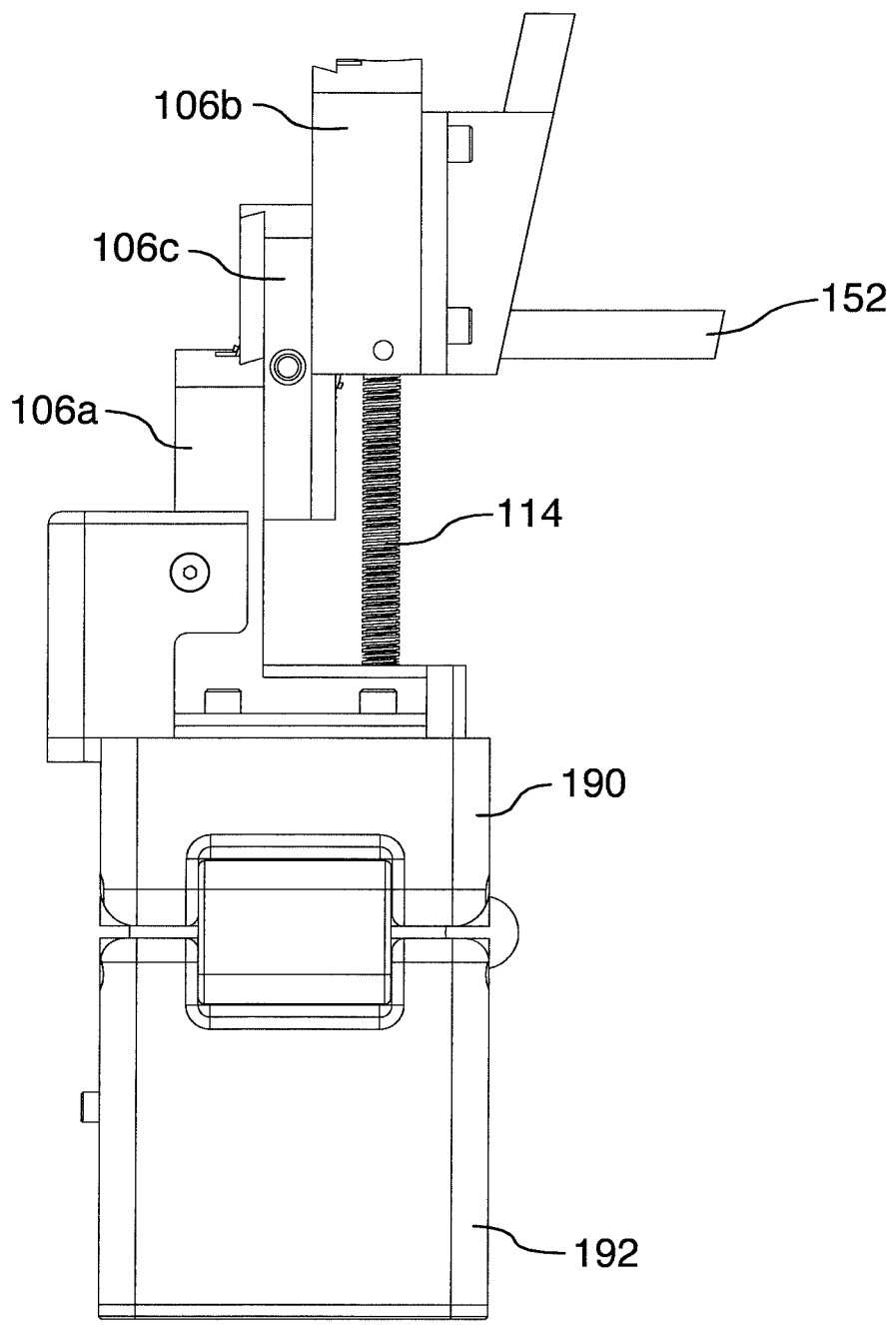
FIG. 12 is a drawing which shows a right side elevation view of the facing accessory shown in FIG. 1, with the tool holder fully extended.

Operation of the facing accessory will now be described with reference to FIGS. 11 and 12, in accordance with one embodiment.

The first step consists in inserting the shaft 150 between the first and second jaw members 190 and 192 while inserting the key of the first jaw member 190 into the keyway 196 of the shaft 150, and securing together the first and second jaw members 190 and 192 using the bolt assembly. It should be understood that the facing accessory 100 is secured to the shaft 150 at an adequate location along the length of the shaft 150. An adequate facing tool 152 is also secured to the tool holding bracket 136 before or after securing the shaft mounting portion 102 to the shaft 150.

Then, the facing accessory 100 is controlled using a remote controller. The remote controller is provided with wireless communications means for sending commands to the communication unit of the facing accessory 100. For example, the command sent by the remote controller may be indicative of a desired position for the facing tool 152 with respect to the shaft 150, a desired extension length for the tool holder 104, a desired motion pattern for the tool holder 104, and/or the like.

The control unit 202 of the tool accessory 100 receives the command from the remote controller via the wireless communication unit and activates the motor 164 according to the received command. For example, the tool holder 104 may be in a retracted position, as illustrated in FIG. 11, before receiving the command from the remote controller. The command may be indicative of a desired position for the facing tool 152. In this case, the control unit 202 may be configured for determining an adequate voltage to be applied to the motor 164 so that the facing tool 152 be positioned at the desired position with respect to the shaft 150. The control unit then applies the determined voltage to the motor 164 in order to activate the motor 164. Upon activation of the motor 164, the drive gear 168 is rotated, which in turns rotates the driven gears 176, 178 and 180. The rotation of the driven gear 180 drives the rotation of the screw shaft 114 which moves the section 106b of the tool holder 104 away from the shaft receiving mounting 102. When the facing tool 152 has reached the desired position as illustrated in FIG. 12, the control unit stops applying a voltage to the motor 164 which in turns stops the rotation of the gears 168, 176, 178, and 180, and of the screw shaft 114.

While in the above description, the tool holder 104 has a length along the radial axis that is variable due to the telescopic arm, it should be understood that other configurations are possible. For example, the tool holder 104 may have a substantially fixed length along the radial axis and comprise no telescopic arm. Instead, the tool holder may have a substantially fixed length along the radial axis while still being able to move the facing tool 152 along the radial axis. The tool holder comprises a translation stage extending radially from the shaft mounting portion 102 and adapted to receive the facing tool 152 thereon. The translation stage is adapted to translate the facing tool 152 along the radial axis away from or towards the shaft mounting portion 102. The translation stage may comprise a rail provided on its front face, i.e. the face that faces the workpiece to be faced. The rail extends radially along at least a portion of the tool holder and is adapted to slidably receive a tool holding bracket such as the tool holding bracket 136. A drive belt may be positioned within the tool holder. The drive belt is operatively connected to the motor 164 so that activation of the motor 164 triggers movement of the drive belt away from or towards the shaft mounting portion 102, depending on the rotation direction of the motor 164. The tool holding bracket is fixedly secured to the drive belt so that movement of the drive belt translate the tool holding bracket along the radial axis away from or towards the shaft mounting portion 102, depending of the rotation direction of the motor 164.

It should be understood that, in this embodiment, the facing accessory comprises the power source 198, the control unit 202, and the communication unit so that no external source of power is necessary for powering the motor 164 and translating the facing tool 152 along the radial axis.

In one embodiment, the facing accessory 100 is removably mounted to the shaft 150. In this embodiment, the facing accessory 100 may be connected to the shaft for performing a facing operation on a workpiece and removed from the shaft 150 once the facing operation is over. The facing accessory could then be replaced with a boring accessory for performing a boring operation on the workpiece, or with any other accessory for performing an operation corresponding to this accessory.

Alternatively, the facing accessory 100 could be permanently secured to the shaft 150, or may even be integrally formed with the shaft 150.

Although the above description relates to a specific preferred embodiment as presently contemplated by the inventor, it will be understood that the invention in its broad aspect includes mechanical and functional equivalents of the elements described herein.

The invention claimed is:

1. A facing accessory for a portable boring apparatus, the accessory comprising:
   a shaft mounting portion for mounting to a longitudinal shaft of the portable boring apparatus extending along a longitudinal axis;
   a tool holder secured to the shaft mounting portion and adapted to receive a facing tool thereon, the tool holder comprising at least an extendable arm for enabling movement of the facing tool towards and away from the shaft mounting portion along a radial axis relative to the longitudinal shaft, the extendable arm having an adjustable length and comprising at least:
      a first section secured to the shaft mounting portion and extending radially away from the shaft mounting portion; and
      a second section extending along the radial axis and slidably connected to the first section to allow a translation of the second section relative to the first section along the radial axis, the facing tool being securable to the second section; and
   an actuator including a drive assembly operatively connected to the second section of the extendable arm for translating the second section relative to the first section along the radial axis;
   wherein the extendable arm further comprises a third section slidably secured to the first and second sections between the first and second sections so that a translation of the second section drives a translation of the third section along the radial axis;
   wherein the first section comprises a first guide recess and the third section comprises a first protrusion slidably engaged within the first recess, and the second section comprises a second guide recess and the third section comprises a second protrusion slidably engaged within the second recess; and
   wherein the first section further comprises a first rack groove extending from the first recess along the radial axis and a first guide rack inserted within the first rack groove, the second section comprises a second rack groove extending from the second recess along the radial axis and a second guide rack inserted within the second rack groove, and the third section comprises an aperture extending therethrough along the longitudinal axis and a synchronization gear rotatably secured within the aperture, the synchronization gear being operatively connected to the first and second guide racks to control an extension of the second and third sections.

2. The facing accessory of claim 1, wherein the actuator further comprises a transmission assembly operatively connected to the drive assembly, and a screw shaft, the second section of the extendable arm comprising a threaded opening on a side facing the shaft mounting portion, a first end of the screw shaft being operatively connected to the transmission assembly and a second end of the screw shaft being threadingly engaged in the threaded opening.

3. The facing accessory of claim 2, wherein the drive assembly comprises a motor and a drive gear operatively connected to the motor so that activation of the motor triggers rotation of the drive gear.

4. The facing accessory of claim 3, wherein the transmission assembly comprises a gear box operatively connected to the drive gear, the gear box comprising at least one driven gear and the first end of the screw shaft being secured to one of the at least one driven gear so that a rotation of the drive gear drives a rotation of the screw shaft, and thereby a translation of the second section along the radial axis.

5. The facing accessory of claim 1, wherein the third section comprises a first guide groove adjacent to the first protrusion and the first section comprises a first tenon projecting therefrom and slidably engaged within the first guide groove, and the third section comprises a second guide groove adjacent to the second protrusion and the second section comprises a second tenon projecting therefrom and slidably engaged within the second guide groove, the first and second guide groove each having a predefined length for limiting a translation of the third section relative to the first section and a translation of the second section relative to the second section, respectively.

6. The facing accessory of claim 1, further comprising:
a wireless communicator adapted to receive a command from a remote controller; and
the actuator controlled according to the received command, the actuator, the wireless communicator being connectable to an internal power source.

7. The facing accessory of claim 1, wherein the shaft mounting portion comprises a first jaw member secured to the tool holder and having a first inner recess for receiving the longitudinal shaft, and a second jaw member having a second inner recess for receiving the longitudinal shaft, the first and second jaw members being securable together around the longitudinal shaft, and the first and second inner recesses forming together a shaft receiving recess sized and shaped to fit snuggly around the longitudinal shaft when the first and second jaw members are secured together.

* * * * *